United States Patent
Hasegawa

[11] Patent Number: 5,878,478
[45] Date of Patent: Mar. 9, 1999

[54] METHOD FOR ATTACHING A SEAT BELT CUTTER TO A PAD IN A VEHICLE

[75] Inventor: Kouei Hasegawa, Sanjo, Japan

[73] Assignee: Kabushiki-Kaisha Hasekou Seisakusho, Niigata-ken, Japan

[21] Appl. No.: 865,984

[22] Filed: May 30, 1997

Related U.S. Application Data

[62] Division of Ser. No. 582,578, Jan. 3, 1996.

[30]      Foreign Application Priority Data

Feb. 23, 1995  [JP]  Japan ...................................... 7-58193

[51] Int. Cl.$^6$ .................................................. B23P 11/02
[52] U.S. Cl. ...................... 29/525.01; 206/349; 211/70.6; 248/205.2; 248/316.1
[58] Field of Search ........................... 29/525.01, 525.03, 29/525.04, 453; 206/349, 374; 211/70.6, 70.7, 70.8; 248/205.2, 500, 316.1, 503

[56]           References Cited

U.S. PATENT DOCUMENTS

| 83,499 | 10/1868 | Holtzscheiter | 7/144 |
|---|---|---|---|
| 487,635 | 12/1892 | McGown | 7/144 |
| 822,066 | 5/1906 | Morkert | 7/144 |
| 980,786 | 1/1911 | Humphries | 7/144 |
| 981,786 | 1/1911 | Montgomery | 7/144 |
| 2,545,320 | 3/1951 | Tilson et al. | 248/500 |
| 3,735,860 | 5/1973 | Nissen et al. | 206/349 |
| 3,790,976 | 2/1974 | Stencil | 7/144 |
| 4,069,915 | 1/1978 | Schurman | 206/349 |
| 4,373,628 | 2/1983 | Dantes | 206/349 |
| 4,592,467 | 6/1986 | Lechner | 7/144 |
| 4,830,247 | 5/1989 | Banks | 211/70.6 |
| 4,985,954 | 1/1991 | Wehr | 7/144 |
| 4,985,998 | 1/1991 | Howard | 30/155 |
| 5,082,111 | 1/1992 | Corbitt, Jr. et al. | 211/70.6 |
| 5,085,449 | 2/1992 | Hudson . | |
| 5,249,770 | 10/1993 | Louthan | 248/205.2 |
| 5,413,223 | 5/1995 | Kang | 211/70.6 |
| 5,630,242 | 5/1997 | Oginaezawa | 7/144 |

FOREIGN PATENT DOCUMENTS

| 0531679A1 | 3/1993 | European Pat. Off. . |
|---|---|---|
| 1922162 | 11/1969 | Germany . |
| 64-9077 | 1/1964 | Japan . |
| 54-141573 | 10/1979 | Japan . |
| 57-39860 | 3/1982 | Japan . |
| 64-2657 | 1/1989 | Japan . |
| 4-28506 | 5/1992 | Japan . |
| 5-58519 | 8/1993 | Japan . |

OTHER PUBLICATIONS

Abstract of GM 82 03 739, GMA–Heft 27 vom 8,7,1982, 1071, KLASSE B26 with English translation.

*Primary Examiner*—David P. Bryant
*Attorney, Agent, or Firm*—Birch, Stewart, Kolasch & Birch, LLP

[57]           ABSTRACT

A method for attaching a seat belt cutter to an area adjacent a driver's seat is provided. The seat belt cutter comprises a blade and hammer provided in one grip member. A device for attaching the seat belt cutter is provided with restraining holes and insert holes, respectively, on opposite ends and opposite sides. A tape having hook-like projections on a downward surface is inserted between the insert holes and is fixedly attached to a pad having loop-like projections on an upper surface to affix the device in place. Alternatively, a screw is threaded into the restraining holes and is fixed to an ordinary pad to hold the device in place.

9 Claims, 8 Drawing Sheets

METHOD FOR ATTACHING A SEAT BELT CUTTER TO A PAD IN A VEHICLE

This application is a divisional of copending application Ser. No. 08/582,578, filed on Jan. 3, 1996, the entire contents of which are hereby incorporated by reference.

FIELD OF THE INVENTION

This invention relates to a seat belt cutter for automotive vehicles and a method for attaching the cutter device to a driver's seat.

BACKGROUND OF THE INVENTION

When a vehicle collision has occurred, a seat belt is rapidly locked due to shock of the collision. This makes a driver sitting on a driver's seat and a passenger sitting on an assistant driver's seat with a seat belt around their bodies unable to move. As a consequence, the driver and the passenger sitting next to the driver are unable to escape from the vehicle.

In order to cope with such a critical situation as mentioned above, a seat belt cutter or scissors are, in some cases, kept nearby the driver's seat. However, since a blade portion of such a cutter is usually exposed outside, there is a risk that the user accidentally cuts the finger during the handling of the cutter. Moreover, since no exclusive-use scissors are available, the seat belt cannot be rapidly and completely cut by one action. Thus, those conventional cutter and scissors greatly lack practicality.

It is therefore a first object of the present invention to provide an emergency seat belt cutter in which the above-mentioned inconveniences are fully obviated, handling is not dangerous and cutting operation can rapidly be made in an emergency.

Heretofore, no special consideration is given at all, on the side of a provider of a seat belt cutter, to an idea that the seat belt cutter should be kept in a suitable place nearby the driver's seat as seat belt attaching means. Accordingly, there was no other way for the driver but to select a desired place for keeping the seat belt cutter.

It is therefore a second object of the present invention to provide a method for attaching a seat belt cutter in which a seat belt cutter is fixedly kept in a most convenient place nearby the driver's seat by reasonable means capable of obviating the above-mentioned inconveniences.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
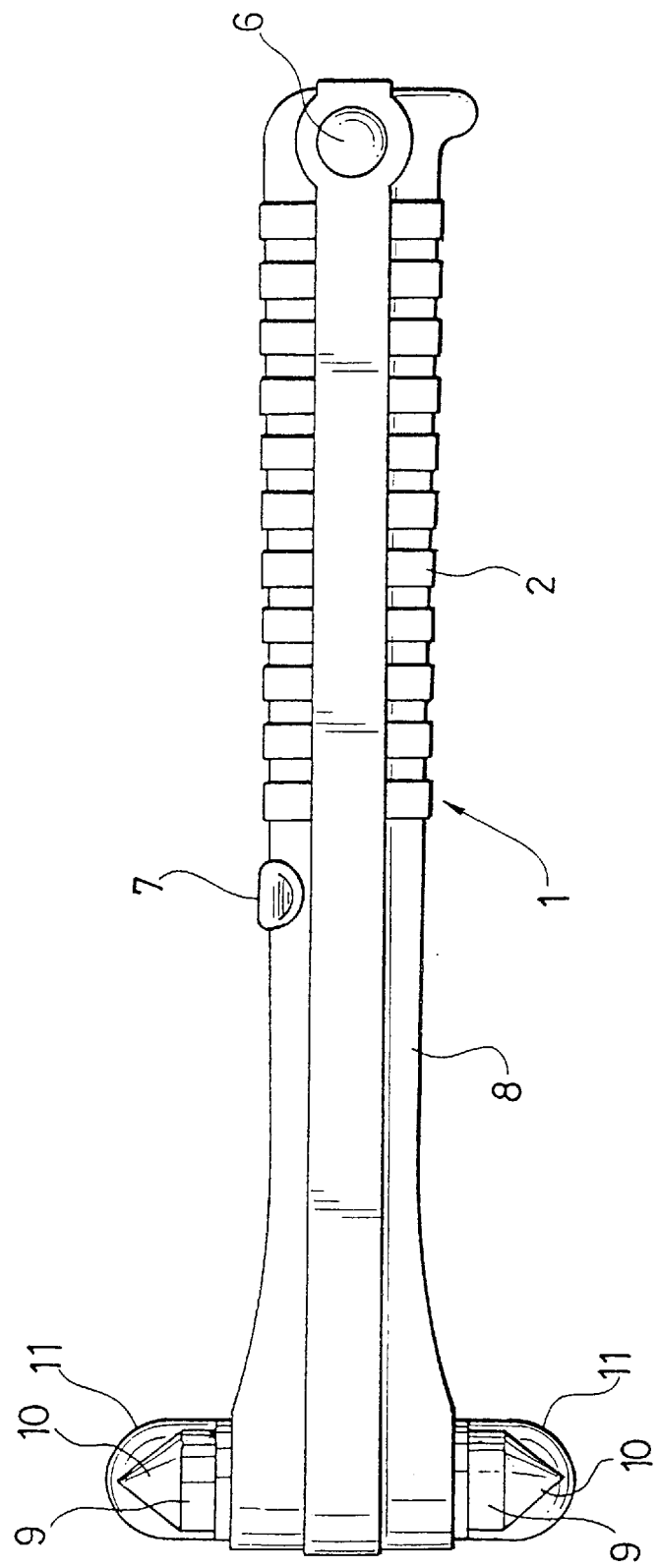
FIG. 1 is a front view of an overall seat belt cutter.
Figure 2:
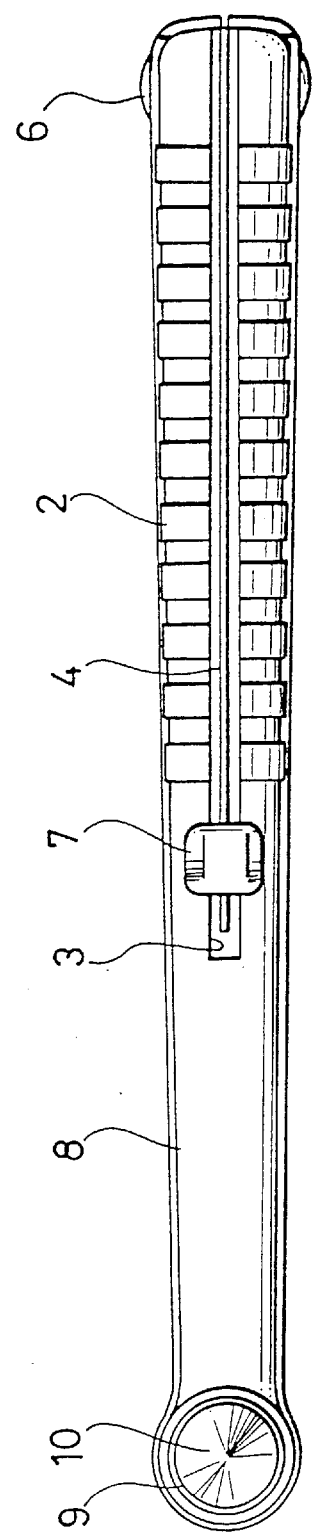
FIG. 2 is a plan view of an overall seat belt cutter.
Figure 3:
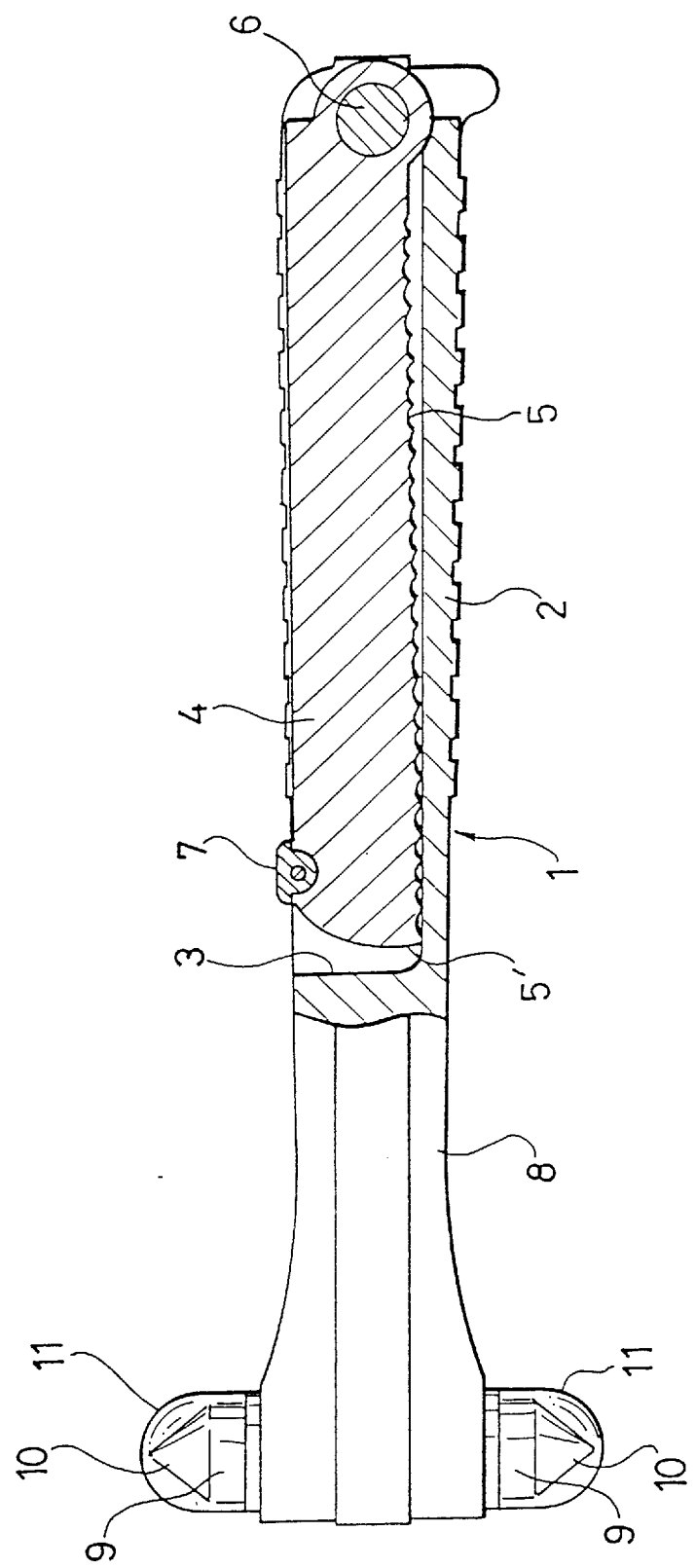
FIG. 3 is a front view, partly cut-away, of an overall seat belt cutter.
Figure 4:
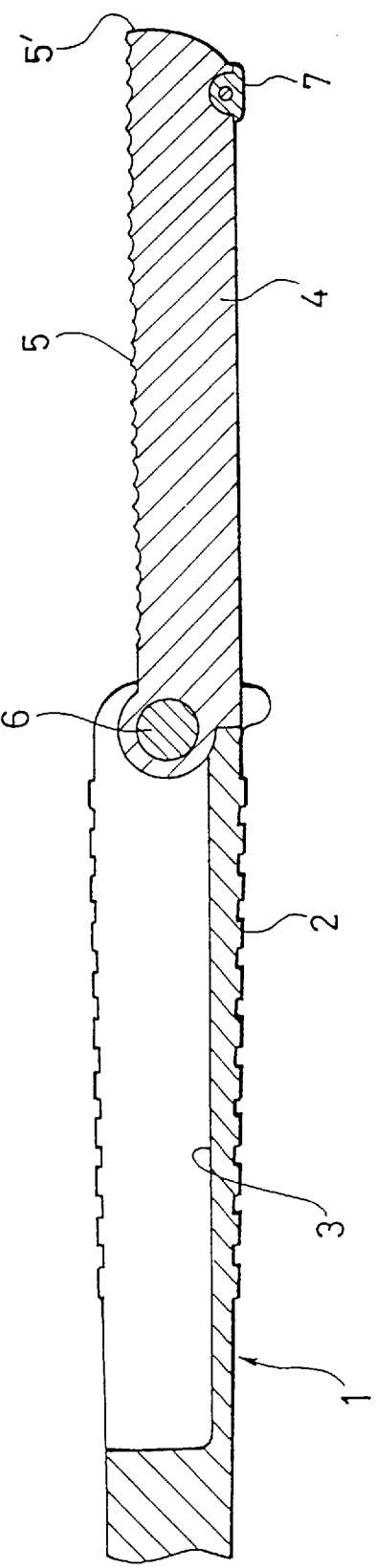
FIG. 4 is a front sectional view of an important portion when in use.

One preferred construction and operation of the present invention will now be described in detail with reference to the accompanying drawings.

Reference numeral 1 denotes a grip member. A concave groove 3 having a suitable length and depth is formed in one side portion 2 of the grip member 1.

Reference numeral 4 denotes a blade member. The blade member 4 is received in the concave groove portion 3 with its basal end portion pivotally attached to one end portion of the concave groove portion 3, so that the blade member 4 can be opened and closed relative to the concave groove 3. The blade member 4 has a serrated edge portion 5. A distal end portion 5' of the blade member 4 is arcuate.

Reference numeral 7 denotes a handle (or knob) disposed on one end of the back of the blade member 4. The blade member 4 can be pulled out from the concave groove 3 through the handle 7.

Reference numerals 9, 9 denote a pair of hammer members. The hammer members 9, 9 respectively have sharply pointed head portions 10, 10 disposed on left and right sides of one end portion of the other side portion 8 of the grip member 1. Transparent caps 11, 11 are fitted to the sharply pointed head portions, respectively.

Figure 5:
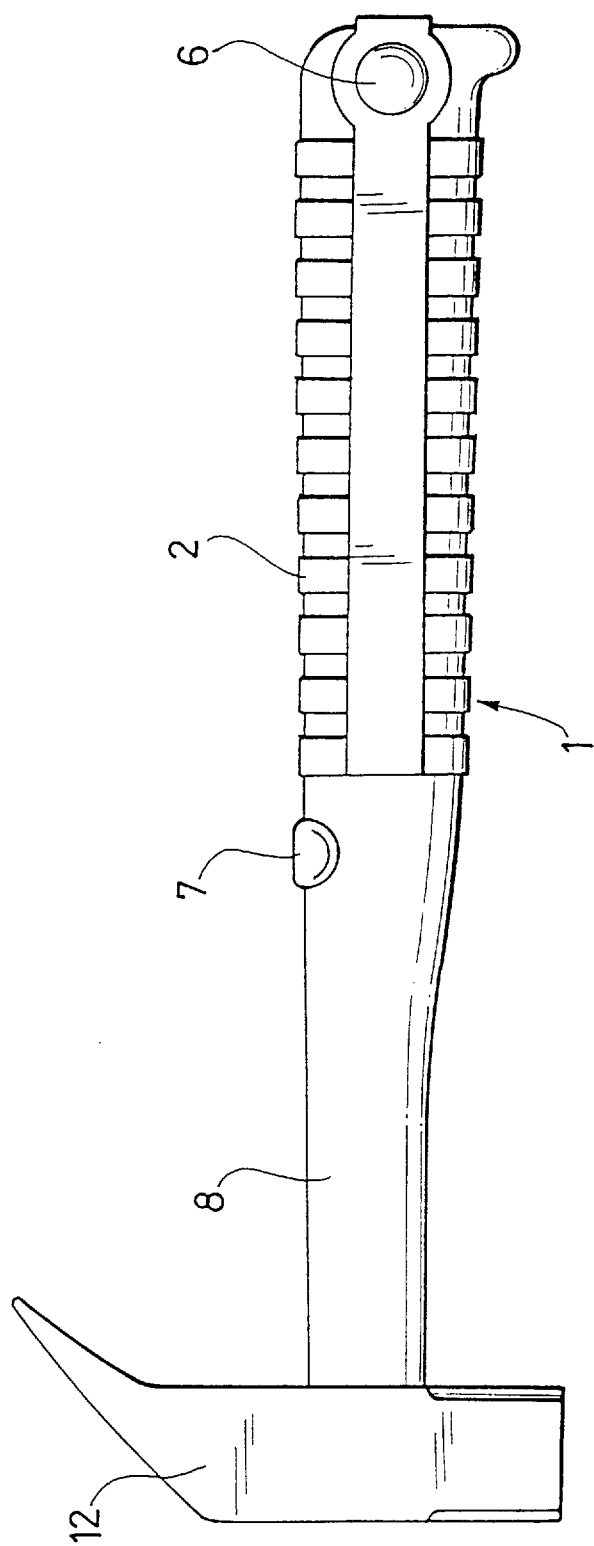
FIG. 5 is a front view of an overall seat belt cutter according to another embodiment.

FIG. 5 shows another embodiment of the present invention. Instead of the pair of hammer members 9, 9 having sharply pointed head portions of the preceding embodiment, a single hammer member 12 is provided on the other end portion of the grip member 1.

Figure 6:
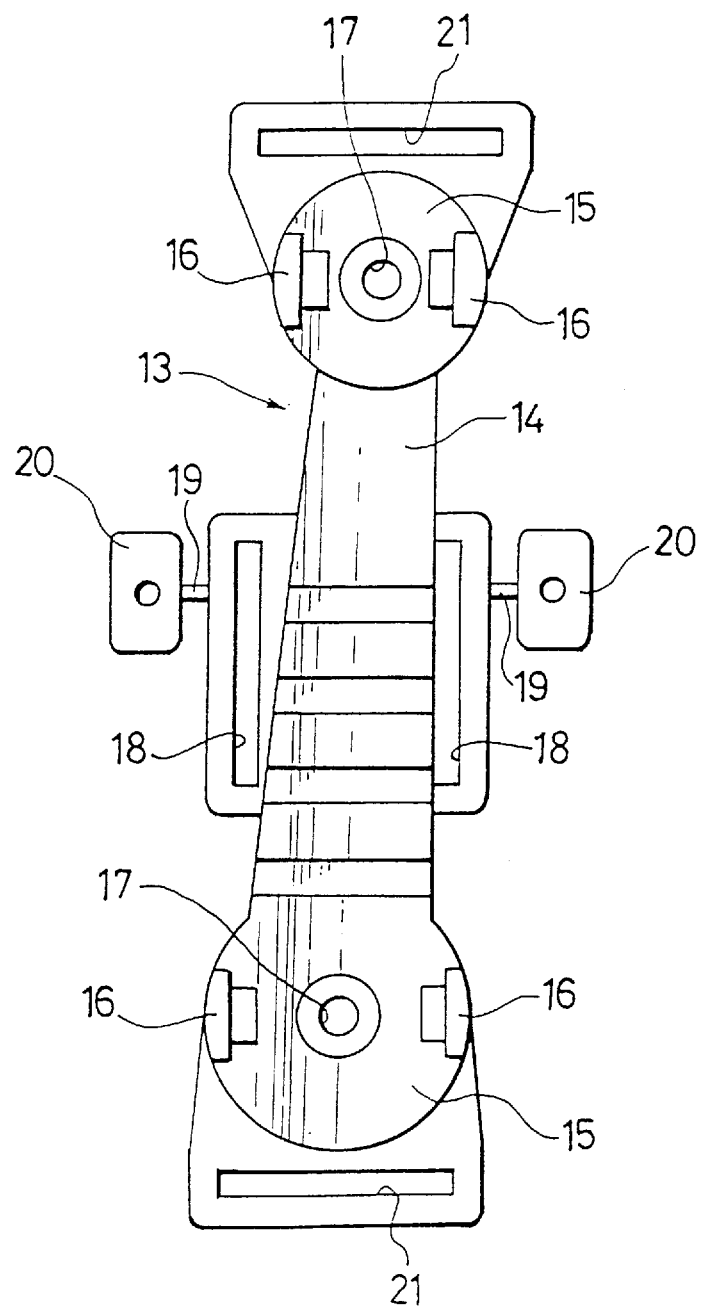
FIG. 6 is a plan view of an overall mounting device.
Figure 7:
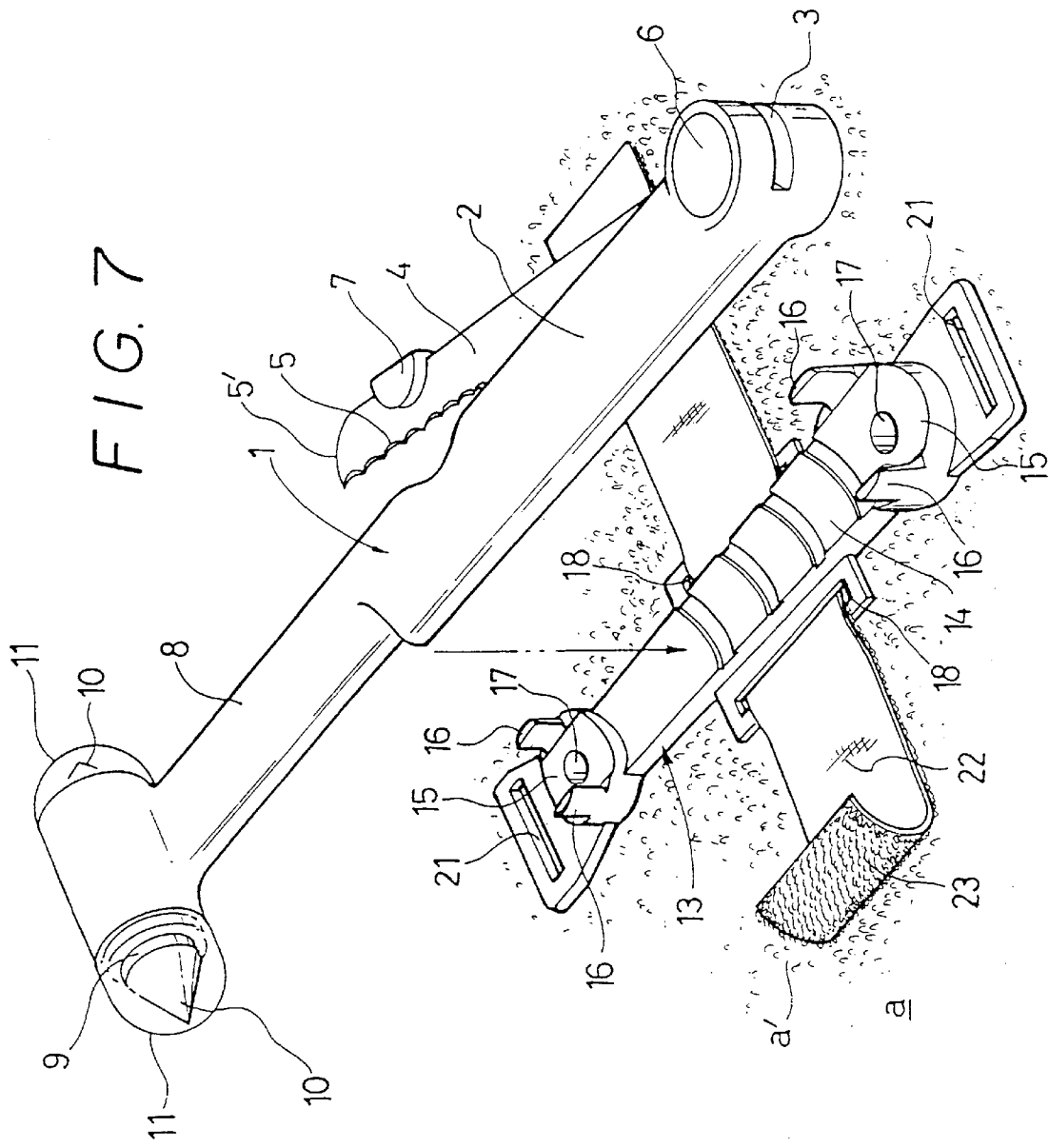
FIG. 7 is a perspective view of an overall mounting device before the attachment.
Figure 8:
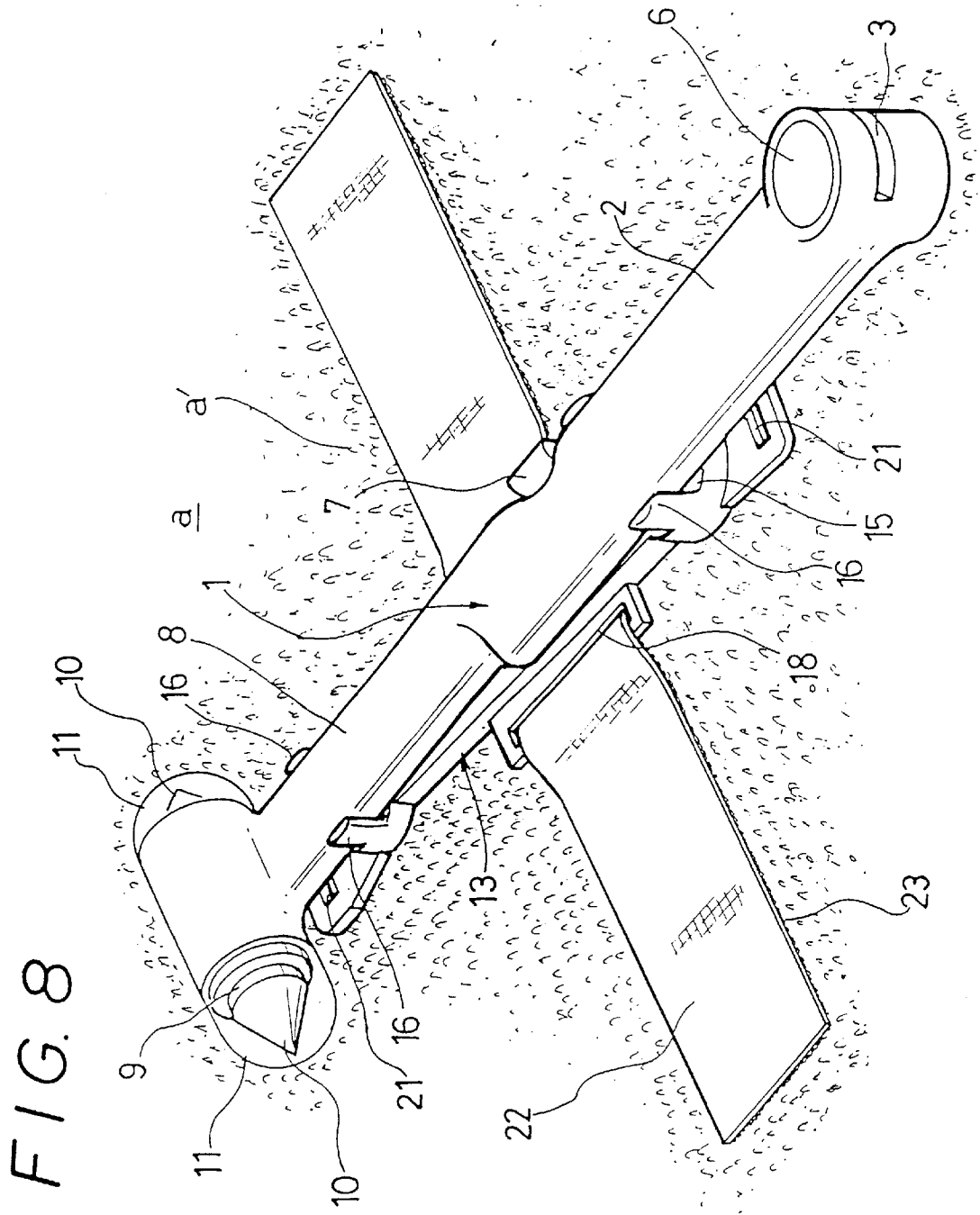
FIG. 8 is a perspective view of an overall mounting device after the attachment.

In FIG. 6, reference numeral 13 denotes a mounting device for retaining the seat belt cutter when the seat belt cutter is not in use. This mounting device comprises a base member 14 having a predetermined length, and two restraining members 15, 15 one of which is disposed on a front end of the base member 14 and the other of which is disposed on a rear end thereof. An inner side of the base member 14 terminates in a concave arcuate surface. The restraining members 16 are respectively provided with restraining pieces 16, 16 formed on and erected from left and right side portions thereof. The grip member 1 is placed on the base member 14 and the restraining members 15, 15 of the mounting device 13, so that grip member 1 is restrained from both the left and right sides.

Throughholes 17, 17 are formed in the centers of the restraining members 15, 15, respectively. Screws are threaded into the throughholes 17, 17, respectively. Throughhole members 20, 20 as later described are respectively attached to distal end portions of the screws through pads as later described.

Reference numerals 18, 18 denote insert hole portions provided on left and right side portions of the base member 14 of the mounting device 13. A tape 22 as later described is inserted between the insert holes 18, 18 and extends leftwardly and rightwardly. Throughholes 20, 20 are provided in outward locations of the insert hole portions 18, 18 through breakage elements 19, 19, respectively.

Reference numerals 21, 21 respectively denote insert hole portions provided on front and rear side portions of the restraining members 15, 15. A tape 22 as later described is inserted between the insert holes and allowed to extend forwardly and backwardly.

Reference numeral 22 denotes a tape have a large number of hook-like projections 23 formed on one side thereof. This tape with said one side facing down is inserted between the insert holes 18, 18 in a leftward and rightward direction and between the insert holes 21, 21 in a forward and backward direction.

Reference character a denotes a pad made of cloth. The pad a is laid on an area in the vicinity of the foot portion of the driver's seat, with a surface a' having a loop-like projections facing upward. This kind of a cloth pad is usually provided on any automobile. When the driver adheres the tape 22, which has been attached to the mounting device 13 in the left and right direction or front and rear direction, or both directions, to a suitable place of the pad a, the hook surface of the tape side is fixedly attached to the loop surface of the pad side. In this case, since the throughhole members 20, 20 are not required, the breakages 19, 19 can be omitted.

However, the cloth pad a is not usually used in a truck. Since it is a pad made of vinyl or synthetic rubber that is usually used in a truck, the tape 22 of the above-mentioned type cannot be used because the tape cannot be fixedly attached to the pad made of vinyl or synthetic resin. In such a case, therefore, separately prepared screws are threaded into the throughholes 17, 17 of the restraining members 15, 15. The screws are further passed through throughholes formed in the pad so as to be engaged with the throughhole members 20, 20 as washers. By doing this, the mounting device 13 of the seat belt cutter is attached to the pad. It should be noted that this arrangement is not shown.

I claim:

1. A method for attaching a seat belt cutter to a base member comprising the steps of:
   providing the base member with at least one set of hole portions provided therein, the at least one set of hole portions being provided on at least one of left and right side portions or forward and backward ends of the base member;
   inserting a tape into at least one of the at least one set of hole portions, the tape having a plurality of hook projections on one surface thereof;
   fixedly attaching the hook projections on the tape to an upper surface of a pad; and
   detachably mounting the seat belt cutter in the base member.

2. The method according to claim 1, wherein the seat belt cutter comprises,
   a grip with a concave groove on one side thereof,
   a blade member pivotally attached at a basal end portion thereof to an interior of the concave groove, the blade member having an arcuate distal end portion and a serrated edge portion, the blade member being pivotable from an open to a closed position, the blade member being within the concave groove when in the closed position,
   a handle provided on a back of the blade member, and
   a pair of hammer members provided at an end of the grip.

3. The method according to claim 2, further comprising the step of providing the hammer members with sharply pointed heads.

4. The method according to claim 1, wherein the step of inserting the tape includes inserting the tape into the set of hole portions in the left and right side portions of the base member.

5. The method according to claim 1, wherein the step of inserting the tape includes inserting the tape into the set of hole portions on the forward and backward ends of the base member.

6. The method according to claim 1, wherein two sets of hole portions are provided as the at least one set of hole portions, one set of the hole portions being on the left and right side portions of the base member and another set of the hole portions being on forward and backward ends of the base member, and the method further comprises the step of providing a second tape and wherein the step of inserting the tape includes inserting one of the tapes into the hole portions on the left and right side portions of the base member and inserting another tape into the set of the hole portions on the forward and backward ends of the base member.

7. A method for attaching a seat belt cutter to a base member comprising the steps of
   providing the base member with a forward end and a backward end, a restraining member being provided on the forward and backward ends of the base member;
   mounting the base member to a vehicle, the step of mounting the base member including the steps of
   providing the base member with at least one set of hole portions, the at least one set of hole portions being provided on at least one of left and right side portions or forward and backward ends of the base member;
   inserting a tape into at least one of the at least one set of hole portions, the tape having a plurality of hook projections on one surface thereof; and
   fixedly attaching the hook projections on the tape to an upper surface of a pad in the vehicle; and
   detachably mounting the seat belt cutter into the restraining members of the base member.

8. The method according to claim 7, wherein the seat belt cutter comprises:
   a grip with a concave groove on one side thereof, a blade member pivotally attached at a basal end portion thereof to an interior of the concave groove, the blade member having an arcuate distal end portion and a serrated edge portion, the blade member being pivotable from an open to a closed position, the blade member being within the concave groove when in the closed position,
   a handle provided on a back of the blade member, and
   a pair of hammer members provided at an end of the grip.

9. The method according to claim 8, further comprising the step of providing the hammer members with sharply pointed heads.

* * * * *